United States Patent [19]
Leonard

[11] 4,429,466
[45] Feb. 7, 1984

[54] LAYOUT COMBINATION TOOL

[76] Inventor: Wilbur Leonard, 6200 SW. 17th St., Margate, Fla. 33068

[21] Appl. No.: 319,734

[22] Filed: Nov. 9, 1981

[51] Int. Cl.³ .............................................. G01B 3/30
[52] U.S. Cl. .................................... 33/180 R; 33/138; 33/174 G; 33/371; 33/DIG. 10
[58] Field of Search ........ 33/174 G, 180 R, DIG. 10, 33/197, 189, 191, 194, 371, 138

[56] References Cited

U.S. PATENT DOCUMENTS

| | | | |
|---|---|---|---|
| 1,135,089 | 4/1915 | Wilks | 33/174 G |
| 3,242,578 | 12/1964 | Moll | 33/189 X |
| 3,672,064 | 6/1972 | Elkins et al. | 33/180 R |
| 3,812,587 | 5/1974 | Elkins et al. | 33/180 R |
| 3,842,510 | 10/1974 | Elliott | 33/174 G |
| 3,950,857 | 4/1976 | Zanavich | 33/174 G |
| 4,212,108 | 7/1980 | Jackson | 33/174 G |
| 4,228,594 | 10/1980 | Shlager | 33/429 |
| 4,241,510 | 12/1980 | Radecki | 33/180 R |

*Primary Examiner*—William D. Martin, Jr.
*Attorney, Agent, or Firm*—Richard M. Saccocio

[57] ABSTRACT

A combination layout tool for aiding in the installation of a towel bar, a toilet tissue paper holder (sanitary paper holder), a soap dish, a toothbrush holder, or other like device comprising an elongated frame member having templates uniquely positioned thereon including level means, horizontal measuring means, and vertical measuring means.

11 Claims, 10 Drawing Figures

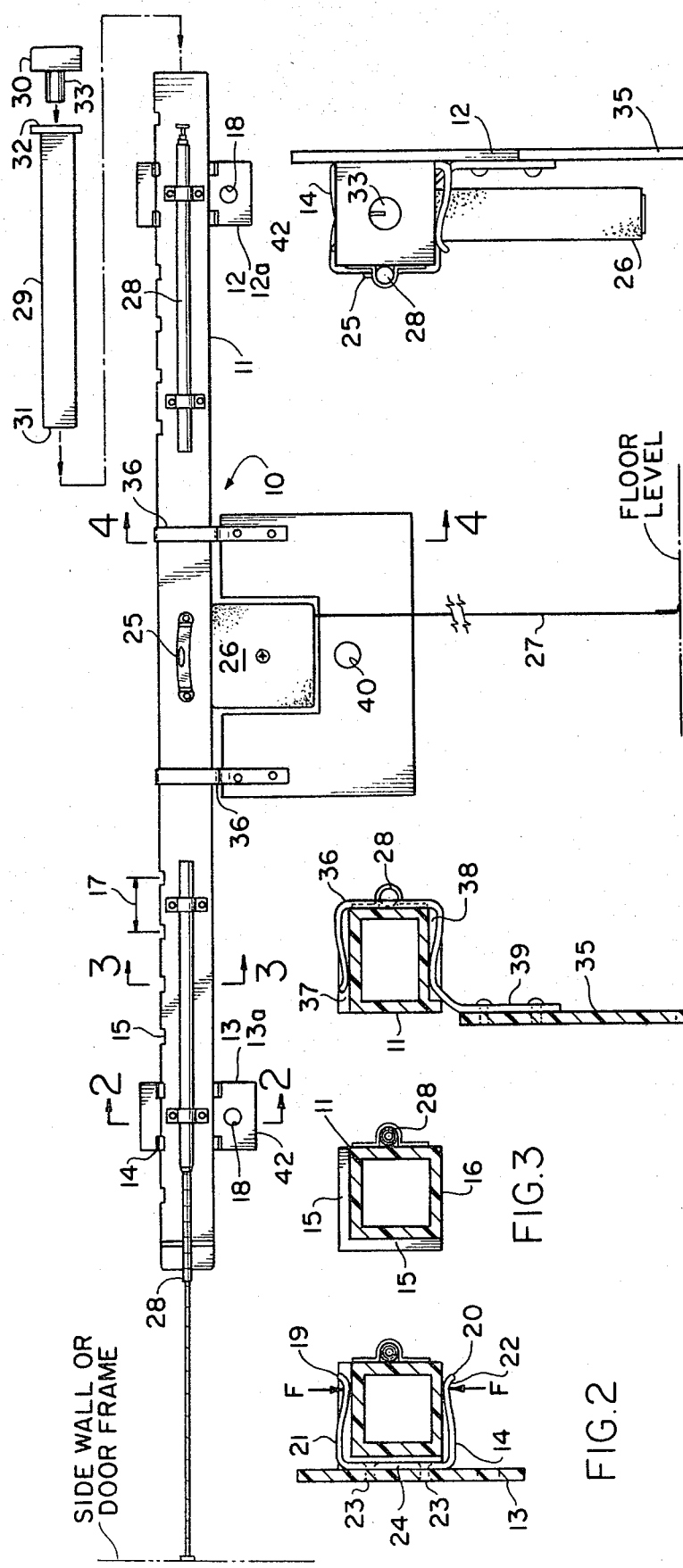
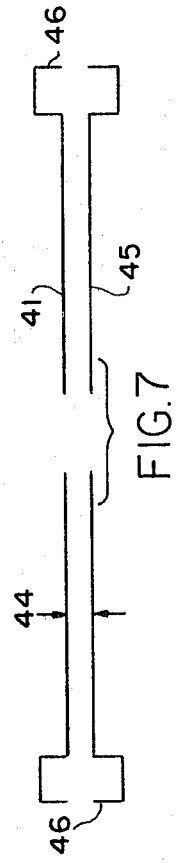

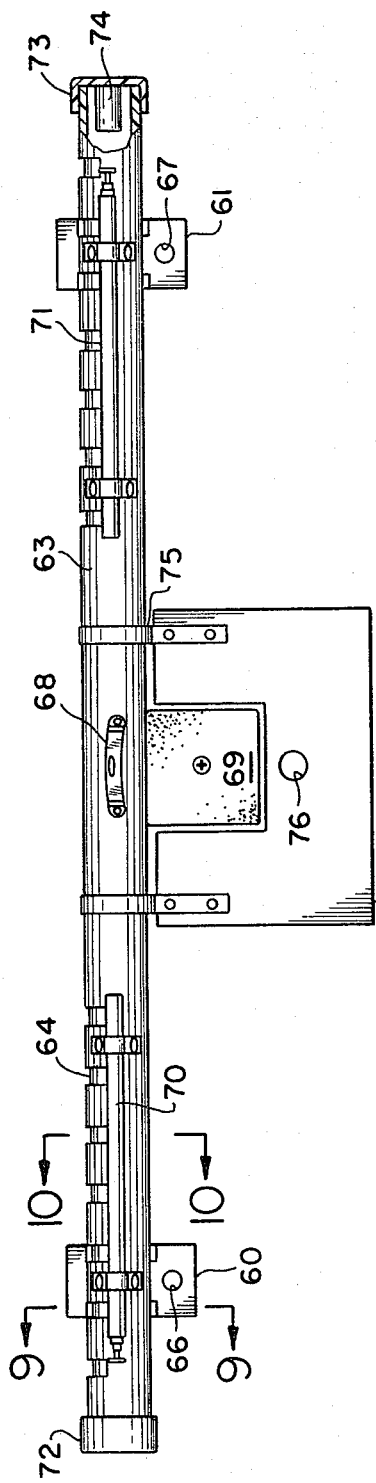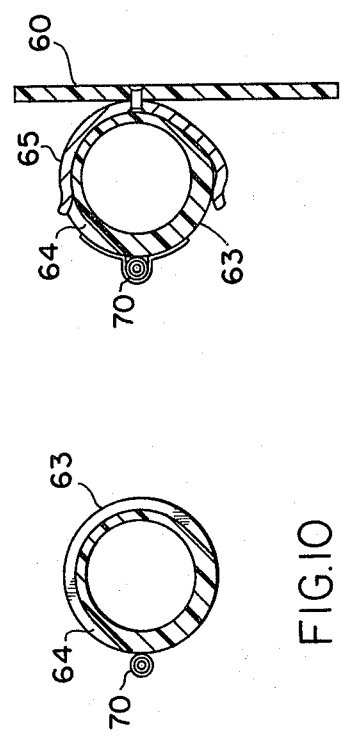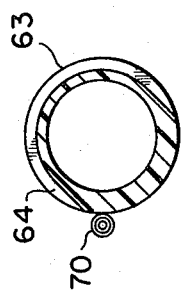

LAYOUT COMBINATION TOOL

BACKGROUND OF THE INVENTION

1. Field of the Invention

This invention relates in general to the field of tools utilized for the construction of buildings and in particular to layout apparatus for assisting in the installation of towel bars, sanitary paper holders, soap dishes and toothbrush holders.

2. Description of the Prior Art

Construction personnel continually encounter location, positioning and aligning problems prior to and during the installation of towel bars, sanitary paper holders, soap dishes and toothbrush holders on vertical walls in the rest rooms of buildings under construction. Typically, in the past, such construction personnel would use a carpenter's level, a tape measure and a pencil to fix the desired aligned location of such devices. The procedure generally used would be to ascertain on which wall the devices are to be installed. Having made this determination, the horizontal and vertical locations must then be fixed. This is usually accomplished with the aid of a tape measure. For example, the worker would measure a horizontal distance from a wall ending, or from a door opening, or from the wall's intersection with another wall. Of course, in fixing the horizontal location, the length of the towel bar must be accounted for. If the worker knows the center location, he must account for one-half the length of the towel bar in fixing the distance from the end of the towel bar to the reference location. The necessity for a construction worker to account for such factors often results in the towel bar being installed at an incorrect location. Similar considerations govern the installation of a paper holder, a soap dish and a toothbrush holder although any resulting errors would not be as obvious because of the shorter horizontal length of these items. Even if the construction plans specifically call for an end location of a towel bar, errors can and often do result because of installing the wrong end of the towel bar at such location.

There is understandably less chance for error in fixing the horizontal location of the towel bar because of the relative ease in measuring up from the floor to the desired horizontal height. However, if an error is made, it would not be apparent to the construction worker because of the lack of a visual aid. For instance, if a drawing called for a vertical distance above the floor of thirty-eight inches, the worker might mistakenly mark off a distance of say thirty-seven or thirty-nine inches. The inch mistake would not be obvious or readily apparent because all the worker would see would be a pencil mark on the wall. Once the bar is installed, however, a mistake of even one inch would be apparent to a reasonably skilled worker having ordinary experience because of the visual effect of the installed bar. Such visual effect would also be instrumental in noting a mistake in the vertical location of the bar. Unfortunately, the visual effect would only be apparent or observable after the bar is installed. If the mistake is discovered after tile is installed, the problem is compounded.

Another problem encountered in the prior art is associated with the horizontal levelness of the towel bar, soap dish, sanitary paper holder and the toothbrush holder. Towel bars and the other devices should, of course, be installed such that they are horizontally plumb. This necessitates the use of a level or other appropriate device which often is simultaneously manipulated with the aforementioned tape measure. Typically, the worker will hold the level against the wall with one hand while measuring the vertical distance with an extended tape measure held by the other hand. Then, while still holding the level against the wall, he will remove the tape measure, allow it to rewind, pocket the tape measure, grasp a pencil and mark the wall along the length of the level. Hopefully, the marked line will be horizontally plumb and at the correct vertical height. Should the level slip during the measuring stage, an error will result. A conscientious worker should remeasure the levelness of the marked line and should remeasure its horizontal distance. More often than not, such remeasurements are not made and any error will go undetected until after the devices are completely installed. Unless the error or errors are corrected, a less than satisfactory job results.

Still another problem associated with the prior art involves the steps in going from the horizontally marked line to the outline for the towel bar mounting brackets. This includes the location of the holes for the mounting screws as well as the distance between the brackets and the proper marking of the size of the mounting brackets. Such marking must be made in relation to the horizontally marked line, and necessarily involves the inclusion of additional errors of location, or at least the possibility of additional errors.

The preparation for and the installation of both a toothbrush holder and soap dishes, which are usually mounted along the same horizontal surface above a sink but at opposite ends thereof, involve very similar problems as those stated for a towel bar.

Included within the above-stated problems in the prior art is the necessity of the worker to handle a number of different devices in order to accomplish a desired end result. Separate devices which require simultaneous handling are simply inconvenient. There is always the possibility that the worker forgets to bring one of the devices with him. An unnecessary, time consuming trip is then required to obtain the missing device and return to the work site. The further away the work site, the more the resulting inconvenience. For instance, if the worker is involved in the construction of a highrise building, having to return to the ground level to get a pencil or to merely sharpen the pencil is quite inconvenient, unproductive, and a waste of expensive manpower.

Thus, there exists a need to provide apparatus which overcomes the problems associated with presently known prior art devices which are used to aid in the installation of towel bars, sanitary paper holders, soap dishes and toothbrush holders during the construction of new buildings or during the remodeling of or additions to existing buildings.

Accordingly, it is a primary object of the present invention to provide layout apparatus which allows for accurately positioning of a towel bar, a sanitary paper holder, a soap dish and a toothbrush holder during building construction.

Another object of the present invention is to provide layout apparatus which in combination includes vertical and horizontal measuring capabilities, level setting capabilities, and bracket and mounting screw template capabilities for aiding in the installation of a towel bar, a sanitary paper holder, a soap dish or a toothbrush holder.

Still another object of the present invention is to provide apparatus for aiding in the installation of a towel bar, a sanitary paper holder, a soap dish or a toothbrush holder which allows for visual determination of the correctness of the desired installed location of the same.

Yet another object of the present invention is to provide layout apparatus for aiding in the installation of bathroom apparatus which includes means for aiding in the installation of different lengths of towel bars and different distances between a soap dish and a toothbrush holder.

A further object of the present invention is to provide towel bar, sanitary paper holder, soap dish or toothbrush holder layout apparatus in a single tool which is inexpensive, simply constructed, and capable of withstanding construction site environments.

SUMMARY OF THE INVENTION

The present invention overcomes the problems of the prior art by providing layout apparatus for aiding in the installation of a towel bar, a sanitary paper holder, a soap dish or a toothbrush holder. An elongated bar having a bubble level mounted thereon includes a pair of templates disposed at opposite ends of the bar. The templates are shaped to conform to the shape of the mounting brackets of a standard towel bar or a soap dish or a toothbrush holder and may include a hole to mark the location of a fastening device which attaches the mounting bracket to a wall. The templates may be provided with means to adjust the position thereof on the bar for purposes of aiding in the installation of different sizes of towel bars and different distances between a soap dish and a toothbrush holder. The level is provided to assure horizontal plumbness of the final installation. A tape measure attached to the bar provides means for fixing or marking the position of the bar at its desired location above the floor. Measuring apparatus is included such that a desired horizontal distance from a reference point may be attained. The horizontal measuring means is provided with a high degree of stiffness to eliminate any need for a worker to compensate for the lack thereof. A unique relationship of the bar and mounting bracket templates allows for obtaining a virtually complete outline of the bar and the mounting brackets by a simple inversion procedure such that the to be installed location can be visually ascertained to assure correctness prior to the actual installation. Another template is attached to the bar to aid in the installation of a sanitary paper holder.

In this manner, there is marked on a wall, which may or may not be tiled, with great exactness, an outline of a towel bar, a sanitary paper holder, a soap dish and a toothbrush holder so that a final installation can be made with a high degree of assurance that the final installation will be located at its desired location. Such marking is accomplished very simply, accurately, and with a high degree of ease never before known.

These and other features, objects, and advantages of the invention will, in part, be pointed out with particularity and will become apparent from the following more detailed description of the invention, taken in conjunction with the accompanying drawings which form an integral part thereof.

BRIEF DESCRIPTION OF THE DRAWINGS

For a fuller understanding of the invention, reference is had to the following description taken in connection with the accompanying drawings, in which:

FIG. 1 is a front plan view of my new layout tool illustrating one embodiment of the present invention;

FIG. 2 is a cross-sectional view of the embodiment of FIG. 1 taken along the line 2—2;

FIG. 3 is a cross-sectional view of the embodiment of FIG. 1 taken along the line 3—3;

FIG. 4 is a cross-sectional view of the embodiment of FIG. 1 taken along the line 4—4;

FIG. 5 is an end view of the embodiment of FIG. 1;

FIG. 6 illustrates a partial outline of a towel bar drawn in conjunction with the layout tool of FIG. 1;

FIG. 7 illustrates an essentially complete outline of a towel bar drawn in conjunction with the outline of FIG. 5 and the layout tool of FIG. 1 when the latter is inverted;

FIG. 8 is a front plan view of another embodiment of my invention;

FIG. 9 is a cross-sectional view taken along the line 9—9 of FIG. 8; and,

FIG. 10 is a cross-sectional view taken along the line 10—10 of FIG. 8.

DESCRIPTION OF THE PREFERRED EMBODIMENTS

Referring now to FIG. 1 of the drawings, there is depicted therein my new and unique layout tool generally designated by the numeral 10 comprising a single tool which in combination provides a means for a construction worker of ordinary skill to accurately fix the position of a to be installed towel bar, sanitary paper holder, a soap dish and a toothbrush holder. The tool includes a main frame member 11 comprising an elongated bar or rod. In the illustrated embodiment, frame member 11 consists of a square tube which preferably is hollow. Frame member 11 may be made of polyvinyl chloride or other similar material which is impervious to corrosion or free from the effects of an outdoor environment.

A pair of template pieces 12 and 13 are attached to opposite ends of frame member 11. Template pieces 12 and 13 have a configuration which is substantially equal to the external size of metal mounting brackets of a towel bar or the size of the protruding back portion of a ceramic bracket. Hence, template pieces 12 and 13 have a substantially rectangular configuration. It is to be noted that a towel bar (not shown) includes an elongated bar having a mounting bracket attached to each end thereof. The mounting brackets may be attached to a tiled wall, a wall to be tiled, or a plaster board wall and may be secured thereto by a single screw or by an adhesive type of grouting. Template pieces 12 and 13 may be removably attached to frame member 11, such as by spring clip members 14 (FIG. 2) which will be more fully explained hereinafter. Template pieces 12 and 13 may be made from a plastic, metal, or other appropriate material. It is, however, preferred that template pieces 12 and 13 be made from a material which is impervious to corrosion caused by atmospheric conditions.

Frame member 11 may include a plurality of rectangularly-shaped indentations or grooves 15 along the upper horizontal surface and the vertical back surface thereof. The indentations 15 are also shown in FIG. 3.

The axial centerlines of indentations 15 are substantially perpendicular to the axial centerline of frame member 11. It is preferred that no indentation be formed in the lower horizontal surface 16 of frame member 11. Indentations 15 may be separated from each other by distances 17 such that template pieces 12 and 13 may be adjustably positioned along frame member 11 and be separated from each other by a distance substantially equal to standardized lengths of towel bars. In other words, a construction worker may position template pieces 12 and 13 along frame member 11 to exactly coincide with the distance between the mounting brackets of the to be installed towel bar.

As shown in FIG. 2, spring clip 14 comprises an elongated strip or bar formed in the shape of a "C" having squared corners. Ends 19 and 20 are turned slightly upward or away from each other to facilitate attachment to frame member 11. When installed on frame member 11, spring clip 14 exerts forces on frame member 11 in the direction of and at the approximate location indicated by the arrows having the designation "F" thereon. Hence, arms 21 and 22 of clip 14, when not attached to frame member 11, will be slightly displaced toward each other as compared to their relative position in FIG. 2. The greater the displacement, the greater the force exerted on frame member 11. It should be noted that a high degree of force is not required. Only that amount of force is required such that template pieces 12 and 13 are positively attached to frame member 11. In other words, template pieces 12 and 13 should not readily fall off frame member 11. The width of spring clip 14 should be very slightly smaller than the width of indenture 15 such that a snug fit exists therebetween. Two spring clips 14 are provided for each template piece 12 or 13. In this manner, template pieces 12 and 13, when attached to frame member 11, are positioned substantially perpendicular thereto. It is to be appreciated that one spring clip 14 may also allow for such perpendicularity, but two are preferred. Spring clips 14 may be attached to template pieces 12 and 13 by screws or rivets 23 or any other appropriate type of fastener which is well known in the art. It is preferred, however, that no protrusion exist (such as screw or rivet heads) on the back side of templates 12 and 13 or on the inside of spring clips 14. Such protrusions might not allow the back side of templates 12 and 13 to fit flat against a wall while the tool 10 is being used and might not allow the included arm 24 on spring clip 14 to fit within the back indentation 15 on frame member 11.

Templates 12 and 13 are uniquely positioned relative to frame member 11. As can be seen in FIG. 1 and FIG. 2, a larger portion of the templates 12 and 13 exist below the axial centerline of frame member 11 than above the same. The reason for such unique positioning will be more fully explained hereinafter. A hole 18 is provided through the body of each template pieces 12 and 13 for purposes of locating holes in the wall which exactly coincide with the position of the single screw by which the mounting brackets of the towel bar may be attached to said wall. If a mounting bracket involves more than one attaching screw, although this would be extremely rare, additional appropriately located holes may be provided in template pieces 12 and 13.

Leveling means 25 is provided at the approximate center of the length of frame member 11. Leveling means 25 may comprise a simple bubble type of level which allows for aligning the axial centerline of frame member 11 and hence tool 10 with an imaginary horizontal line of the earth's surface. Level means 25 may be attached to frame member 11 or inserted within frame member 11 by any conventional method which is well known in the art.

Height measuring means 26 which, for example, may comprise a tape measure, may be attached to surface 16 of frame member 11 at the same approximate center location as level means 25. Height measuring means 26 allows for locating the bottom surface 16 of tool 10 above a given reference surface such as floor level (or from the ceiling down). Line 27 schematically illustrates a strip of material extending from measuring means 26 to the floor level which further indicates a desired or predetermined height of tool 10 above floor level. In other words, vertical measuring means 26 allows tool 10 to be used to fix the height of the to be installed towel bar above or below a given reference level. In order to measure below a given reference point, the tape may simply be bent upward.

Horizontal measuring means 28 are provided at each end of frame member 11 and are attached thereto. Horizontal measuring means 28 may comprise telescopic apparatus which when extended provide a means for fixing the horizontal distance of the to be installed towel bar from a reference such as a wall or a door frame. Horizontal measuring means 28 may comprise a tape measure similar to that of vertical measuring means 26, or even that of means 26 by bending the tape at a right angle to that shown by line 27. However, it is preferred that horizontal measuring means 28 be rigid when extended so that an individual using tool 10 is not required to handle horizontal measuring means 28 other than extending the same. Inch marks or other such lineal marks may be provided on horizontal measuring means 28 so that the horizontal distance from a reference location may be quickly and exactly fixed. By providing horizontal measuring means 28 on each end of frame member 11, a horizontal distance may be fixed from either end of tool 10.

Each or either end of frame member 11 may be provided with a hollow sleeve 29 which fits within frame member 11. Sleeve member 29 is closed at end 31 and open at end 32. A cap 30 is frictionally fitted to end 32. Sleeve 29 may be used to store pencils or other appropriate marking apparatus. A pencil sharpener 33 (FIG. 5) is provided within cap 30.

Template piece 35 may also attach to frame member 11 by spring clips 36. As can be seen in FIG. 4, spring clips 36 fit snugly within grooves 37 and 38 provided in frame member 11, so as to frictionally attach template 35 to frame member 11. Two spring clips 36 are provided for purposes of horizontally and vertically positioning template 35 square to frame member 11. Spring clips 36 are similar in shape to spring clips 14 with an extra arm 39 extending therefrom. Arm 39 allows spring clips 36 to be attached to template 35. A hole 40 is provided through template 35 for fixing the location of a fastening device such as a screw which may be used to mount a toilet tissue holder to a wall. A cutout may be provided within template piece 35 for purposes of clearing measuring means 26 when attaching and removing template piece 35. The outline of template 35 as previously stated coincides with the outline of a standard size toilet tissue holder. Since template 35 may be detachably mounted to frame member 11, any sized template may be attached thereto. Thus, an appropriately sized template 35 may be alternatively used to fix the location of a soap dish, a toothbrush holder, or other like device which may be affixed to a wall. Groove 38 does not extend through surface 16 to the backside of frame member 11. In this manner, bottom surface 16 presents a clean unobstructed edge enabling the generation of a substantially straight reference line with the use of a pencil guided by surface 16. In this regard, it is to be noted that grooves 15 on the backside of frame member 11 do not interfere with the generation of the substantially straight reference line.

In the alternative, template piece 35 may be permanently attached to frame member such as by an adhesive bond or welding. Such attachment would eliminate the need for spring clips 36, grooves 37 and 38, as well as the measuring means cutout in template piece 35.

FIGS. 5 and 6 show a progressive generation of an outline of the to be installed towel bar when tool 10 is used. Tool 10 is simultaneously positioned relative to a vertical reference point or surface and relative to a horizontal point or surface with the aid of measuring means 26 and 28. Also, simultaneously therewith, frame member 11 is caused to be affixed along a plumb imaginary horizontal line with the aid of level means 25. Such position fixing is accomplished in a matter of seconds by a worker having ordinary skills. A pencil or other marking device which may be withdrawn from within sleeve 29 is used to mark around template pieces 12 and 13 and along bottom surface 16 of frame member 11. The outline shown in FIG. 6 results from this operation (the slight interruption is caused by the presence of measuring means 26). Then, tool 10 is inverted end for end such that surface 16 now points upwards while edges 42 of templates 12 and 13 are caused to coincide with reference lines 43. For this operation, template 35 may be removed so as not to interfere with the generation of line 41. In the alternative, if template 35 remains attached or is permanently attached to frame member 11 during the generation of line 41, further, however slight, interruptions would result due to the presence of spring clips 36 and template piece 35. Such slight additional interruptions would be of little if any consequence. With tool 10 inverted as described, the marking device is again used to trace around templates 12 and 13 and along surface 16. The outline shown in FIG. 7 now results. The unique positioning of frame member 11 with respect to templates 12 and 13 allows for the generation of a substantially complete outline of a to be installed towel bar. The worker may now quickly, by visual means, ascertain the correctness of the location of the to be installed towel bar. It is intended that the thickness 44 of the generated outline (FIG. 7) be a substantially exact representation of the thickness of a towel bar. And, that the relationship of the outline of lines 41 and 45 relative to the outlines 46 is intended to be a substantially accurate relationship of the bar and mounting brackets of a towel bar. Such exact thickness and accurate relationship results from knowing the thickness and relationship of the towel bar and accounting for the same when fixing the position of templates 12 and 13 relative to surface 16 of frame member 11.

If both a soap dish and a toothbrush holder are to be installed above a sink and at opposite ends thereof, template pieces 12 and 13 may be removed and replaced by template pieces 12a and 13a which have a configuration substantially equal to the size of the mounting brackets of a soap dish and a toothbrush holder (or to the size of the protruding back portion of ceramic devices). The tool 10 may then be used in the manner aforedescribed to mark the exact horizontal, vertical and horizontally plumb location of the devices.

FIGS. 8 through 10 illustrate another embodiment of the present invention. For reasons of clarity, the numbers assigned to the various parts of this embodiment other than for the overall tool itself will be different from those of the embodiment of FIGS. 1 through 7. However, such different numbers are not intended to reflect or imply differences in kind between like parts having different numbers.

The layout tool 10 is again provided with end template pieces 60 and 61 and a center template piece 62. These are affixed to hollow bar 63 which is generally round in cross-sectional shape. As in the previous embodiment, template pieces 60 and 61 are positioned relative to bar 63 such that the outline configurations shown in FIGS. 6 and 7 result when the layout tool 10 is used. Bar 63 is provided with grooves 64 along the length thereof having the cross-sectional shape shown in FIG. 10. In this manner the bottom surface of bar 63 is smooth and will not cause any interruptions when the surface is used to generate the horizontal lines 41 and 45 of FIGS. 6 and 7. The width of spring clips 65 is such that they fit snugly within grooves 64 to assure perpendicularity of template pieces 60 and 61 relative to bar 63. Template pieces 60 and 61 may be laterally adjusted along bar 63.

Spring clips 65 are generally circular in shape so as to be spring loaded on bar 63 and have slightly upturned ends to allow for ease of assembly to and disassembly from bar 63. Tmeplate pieces 60 and 61 may conform to the shape of mounting brackets for a towel bar or a soap dish and a toothbrush holder. Holes 66 and 67 provide for layout location of mounting screws.

A bubble level 68 and measuring means 79 are attached to bar 63 as shown. Horizontal measuring means 70 and 71 are again provided at each end of bar 63. Caps 72 and 73 are also provided at each end of bar 63 which may be either frictionally or screw connected thereto. Either of caps 72 or 73 may have a pencil sharpener 74 affixed thereto. The hollow center of bar 63 may be used to store pencils or other marking apparatus. Center template piece 62 may as previously be permanently or removably affixed to bar 63 by spring clips 75 which are generally similar to spring clips 36 of FIG. 1. A layout hole 76 may be provided in template piece 62.

The aforedescribed use of the embodiment of FIG. 1 applies equally to the embodiment of FIG. 8 which for purposes of brevity will not be again described.

While the invention has been described, disclosed, illustrated and shown in certain terms or certain embodiments or modifications which is has assumed in practice, the scope of the invention is not intended to be nor should it be deemed to be limited thereby and such other modifications or embodiments as may be suggested by the teachings herein are particularly reserved especially as they fall within the breadth and scope of the claims here appended.

I claim:

1. Layout apparatus adapted to aid in the installation of a towel bar, a sanitary paper holder, a soap dish, a toothbrush holder, and other like devices on a wall comprising:
   elongated frame means,
   a pair of template pieces oppositely disposed along the length of said frame means, said template pieces having a substantially rectangular shape, a third template piece attached to said frame means having a substantially rectangular shape, measuring means attached to said frame means for positioning said layout apparatus relative to a horizontal reference line, leveling means attached to said frame means positioning said layout apparatus against a substantially flat vertical surface; and, said oppositely disposed template pieces comprising flat plates having a rectangular shape with the horizontal centerline of said template pieces being aligned below a lower edge of said frame means such that a first outline of said frame means and said template pieces in combination with a second outline of said frame means and template pieces when rotated 180° and realigned with said first outline is an outline of a substantially complete towel bar including brackets.

2. Layout apparatus adapted to aid in the installation of a towel bar, a sanitary paper holder, a soap dish, a toothbrush holder, and other like devices on a wall comprising:

elongated frame means, a pair of template pieces oppositely disposed along the length of said frame means, said template pieces having a substantially rectangular shape, a third template piece attached to said frame means having a substantially rectangular shape, measuring means attached to said frame means for positioning said layout apparatus relative to a horizontal reference line, leveling means attached to said frames for horizontally positioning said layout apparatus against a substantially flat vertical surface, said oppositely disposed template pieces being adjustably positionable along the length of said frame means, and removably attached to said frame means by spring clips; and, said frame means includes a plurality of spaced grooves along the length thereof and substantially perpendicular to the axial centerline thereof, said spring clips being fixedly attached to said template pieces and received within said grooves to maintain said template pieces in a substantially perpendicular relationship with said frame means.

3. Layout apparatus adapted to aid in the installation of a towel bar, a sanitary paper holder, a soap dish, a toothbrush holder, and other like devices on a wall comprising:

elongated frame means, a pair of template pieces oppositely disposed and adjustably positionable along the length of said frame means, said template pieces having a substantially rectangular shape, a third template piece attached to said frame means having a substantially rectangular shape, measuring means attached to said frame means for positioning said layout apparatus relative to a horizontal reference line, leveling means attached to said frame means positioning said layout apparatus against a substantially flat vertical surface; and, means for removably connecting said template pieces to said frame means whereby said template pieces are maintained in a substantially perpendicular relationship with said frame means.

4. The apparatus of claim 3 including additional measuring means for positioning said layout apparatus relative to a vertical reference line.

5. The apparatus of claim 4 wherein said additional measuring means is horizontally extendable from said frame means and is of sufficient rigidity to remain horizontal when extended.

6. The apparatus of claim 3 wherein said center template piece is removably attached to said frame means.

7. The apparatus of claim 3 wherein said oppositely disposed template pieces comprise flat plates having a rectangular shape with the horizontal centerline of said template pieces being aligned below a lower edge of said frame means such that a first outline of said frame means and said template pieces in combination with a second outline of said frame means and template pieces when rotated 180° and realigned with said first outline is an outline of a substantially complete towel bar including brackets.

8. The layout apparatus of claim 7 wherein said oppositely disposed template pieces are removably attached to said frame means by and said connecting means comprises spring clips.

9. The layout apparatus of claim 8 wherein said frame means includes a plurality of spaced grooves along the length of said frame means and substantially perpendicular to the axial centerline thereof said spring clips being fixedly attached to said template pieces and received within said grooves to maintain said template pieces in a substantially perpendicular relationship with said frame means.

10. The layout apparatus of claim 9 wherein a lower surface of said frame means is free of said grooves and comprises a substantially smooth, uninterrupted surface.

11. The layout apparatus of claim 3 wherein said frame means is at least partially hollow and adapted to house pencils, pens and other like devices and includes means for sharpening pencils.

* * * * *